United States Patent [19]
Greve et al.

[11] 3,935,021

[45] Jan. 27, 1976

[54] WATER-RESISTANT GYPSUM PRODUCTS

[75] Inventors: Dale R. Greve, Beaverton, Oreg.;
Eugene D. O'Neill, Miami, Fla.

[73] Assignee: Georgia-Pacific Corporation,
Portland, Oreg.

[22] Filed: Nov. 5, 1973

[21] Appl. No.: 412,968

[52] U.S. Cl. ................................ 106/111; 106/116
[51] Int. Cl.² ........................................ C04B 11/14
[58] Field of Search .................... 106/116, 111, 113

[56] References Cited
UNITED STATES PATENTS

| | | | |
|---|---|---|---|
| 2,432,963 | 12/1947 | Camp | 106/116 |
| 3,284,227 | 11/1966 | Gerton | 106/111 |
| 3,649,319 | 3/1972 | Smith | 106/114 X |
| 3,853,689 | 12/1974 | Morrone | 161/182 |

*Primary Examiner*—Patrick P. Garvin
*Assistant Examiner*—John P. Sheehan
*Attorney, Agent, or Firm*—Synnestvedt & Lechner

[57] ABSTRACT

The water resistance of gypsum products, such as gypsum wallboard, is improved by incorporating in the composition from which the gypsum product is made polyvinyl alcohol and wax-asphalt emulsion.

27 Claims, No Drawings

WATER-RESISTANT GYPSUM PRODUCTS

FIELD OF THE INVENTION

This invention relates to water-resistant gypsum products. More particularly, this invention relates to improving the water resistance of gypsum products by incorporating into the composition from which the product is made additives which impart water-resistant properties to the gypsum product.

Gypsum products are normally produced by intimately mixing water with powdered anhydrous calcium sulfate or calcium sulfate hemihydrate ($CaSO_4 \cdot \frac{1}{2}H_2O$), often referred to as calcined gypsum, and thereafter allowing this mixture to hydrate or set into relatively hard calcium sulfate dihydrate ($CaSO_4 \cdot 2H_2O$). An example of a widely used gypsum product is gypsum wallboard, also commonly referred to as dry wall, gypsum board, and plaster board, which comprises a set gypsum core sandwiched between 2 paper liners which form the other surfaces of the wallboard. Gypsum wallboard is widely used as a structural building panel.

A characteristic of set gypsum is that it has a tendency to absorb water. (For example, the gypsum core of a commercially available conventional wallboard can absorb as applications wallboard wallboard much as 60 wt. % water when immersed therein at a temperature of 70°F for about 2 hours.) The absorption of water by the gypsum product has a tendency to reduce the strength of the product. Although there are numerous applications where the characteristic of set gypsum to absorb water is not detrimental to the satisfactory use of the product, there are other applications where the water absorption characteristic is detrimental. These, of course, are applications in which the gypsum wallboard comes into contact with water. For example, gypsum wall board is used on the exterior of buildings where it serves as an underlying surface which is covered with such materials as aluminum or wood siding, or with cement stucco. (Gypsum wall board used in this manner is often referred to as "sheathing".) Also, gypsum wallboard is often used in bathrooms as an underlying surface which is covered with plastic or ceramic tile. (Gypsum wallboard used in this manner is often referred to as "tile-backing board".) Use of gypsum wallboard in such applications can result in the deterioration of the strength of the wallboard if steps are not taken to make the wallboard water-resistant.

This invention relates to the manufacture of water resistant gypsum products by incorporating in the composition from which the gypsum product is made additives which impart water-resistant properties to the product.

REPORTED DEVELOPMENTS

Many additives have been reported as being effective for imparting water-resistant properties to gypsum products. Examples of some water-resistant additives include: metallic resinates (U.S. Pat. No. 1,975,787), wax or asphalt or mixtures thereof (U.S. Pat. No. 2,198,776); a mixture of wax and/or asphalt and also cornflower and potassium permanganate (U.S. Pat. No. 2,269,457); water insoluble thermoplastic organic materials such as petroleum and natural asphalt, coal tar, and thermoplastic synthetic resins such as polyvinyl acetate, polyvinyl chloride and a copolymer of vinyl acetate and vinyl chloride (U.S. Pat. No. 2,483,806); a mixture comprising an alkali metal rosin soap, a water soluble alkaline earth metal salt, and residual fuel oil (U.S. Pat. No. 2,597,901); a mixture comprising petroleum wax in the form of an emulsion and either residual fuel oil, pine tar or coal tar (U.S. Pat. No. 2,604,411); a mixture comprising residual fuel oil and rosin (U.S. Pat. No. 2,610,130); aromatic isocyanates and diisocyanates (U.S. Pat. No. 3,333,974); and organohydrogenpolysiloxanes (U.S. Pat. No. 3,455,710).

The use of such water-resistant additives has one or more shortcomings. For example, it has been found that the use of heretofore known water-resistant additives tends to impart to gypsum products varying degrees of water resistance, that is, the products do not consistently have a uniform degree of water resistance. It has been found also that certain of the emulsions disclosed above are not stable, that is, the emulsion tends to break and solids settle therefrom thereby rendering the material unusable. Also, some of the above mentioned water-resistant additives tend to retard the set time of the gypsum composition. In addition, some of the above mentioned additives are relatively costly and must be used in relatively large amounts in order to provide the desired degree of water resistance. The cost involved in using such additives is a significant percentage of the overall cost of the gypsum product.

A widely used water-resistant additive for gypsum compositions, and other types of cementitious products, consists of a wax-asphalt emulsion (see U.S. Pat. Nos. 2,432,963 and 2,464,759). It is known also to add to the wax-asphalt emulsion of the general type disclosed in the aforementioned patents other materials which are described as being effective to further improve the water-resistant properties of a set gypsum product. Examples of such materials include: potassium sulfate, alkali and alkaline earth aluminates, and Portland cement (see U.S. Pat. Nos. 2,526,537 and 2,526,538). Also, U.S. Pat. No. 2,699,414 discloses the preparation of a wax-asphalt emulsion by adding to a blend of molten wax and asphalt an oil-soluble, water-dispersible emulsifying agent, and pouring the resulting blend into a solution of casein which contains, as a dispersing agent, an alkali sulfonate of a polyarylmethylene condensation product.

A problem encountered in utilizing a wax-asphalt emulsion in gypsum compositions is that it has a tendency to retard the hydration of the gypsum. By way of background, it is noted that it is conventional to add to gypsum set accelerators, that is, materials which decrease the time it takes for the gypsum to set. In general, wax-asphalt emulsions contain organic emulsifying agents, such as proteinaceous materials, which retard the hydration of gypsum. When wax-asphalt emulsion is added to a gypsum composition, a set accelerator, in an amount over and above that normally used, is generally added to the composition in order to counteract the retarding effect of the emulsion. One popularly used set accelerator is ground or powdered gypsum dihydrate ($CaSO_4 \cdot 2H_2O$). However, it is known that the water-resistant properties of gypsum products are impaired by and are inversely proportional to the amount of powdered gypsum dihydrate used to accelerate setting time. Thus, the use of such a set accelerator to offset the set-retarding effects caused by the wax-asphalt emulsion results in a decrease in the water-resistant properties of the gypsum product. Furthermore, in plant production of gypsum wallboard it is not uncommon to find that the water-resistant properties of the wallboard are erratic and unpredictable when utilizing wax-asphalt emulsion as the water-resistant additive. This is generally attributed to commercially available wax-asphalt emulsions having different emulsifying agents present in varying amounts. Since it is important in an industrial manufacturing process to maintain the time setting of the gypsum substantially constant, adjustments in the amount of set accelerator added to the composition must be made to counteract the set-retarding effects produced by the emulsion. The use of varying amounts of the set-accelerator results in the production of gypsum products which have varying degrees of water resistance, and can result in the production of a product which has water-resistant properties below accepted standards.

Another material that has been disclosed as being effective in imparting improved moisture resistance to gypsum products is polyvinyl alcohol, as disclosed in U.S. Pat. No. 3,649,319. This patent discloses a medical cast prepared from a composition containing plaster of Paris and polyvinyl alcohol or a mixture of polyvinyl alcohol and a minor amount of polyvinyl acetate. The patent discloses that the best moisture resistance is obtained by utilizing completely hydrolyzed polyvinyl acetate having a viscosity of 70 cps at 20°C. (It is noted that polyvinyl alcohol is made by hydrolyzing polyvinyl acetate and thus, completely hydrolyzed polyvinyl acetate is in effect 100% polyvinyl alcohol.) In general, industry standards for water-resistant wallboard are relatively quite high compared to the water-resistant properties desired in a medical cast. It is believed that polyvinyl alcohol has not been used as a water-resistant additive in gypsum wallboard because it has been generally considered to be relatively water sensitive compared to water-resistant additives such as wax-asphalt emulsions.

It is an object of this invention to provide improved means for preparing water-resistant gypsum products, including particularly gypsum wallboard.

SUMMARY OF THE INVENTION

In accordance with this invention, it has been found that a number of important advantages are realized and gypsum products having excellent water-resistant properties can be produced by including in a gypsum composition both polyvinyl alcohol and wax-asphalt emulsion. The use of both of these materials in a gypsum composition has resulted in the unexpected and surprising discovery that products made therefrom have water-resistant properties that are better than products utilizing either polyvinyl alcohol or wax-asphalt emulsion alone. By way of brief illustration, is noted that a gypsum product made from a composition containing 0.4 wt. % polyvinyl alcohol and 7 wt. % wax-asphalt emulsion was found to absorb only 1.2 wt. % water, whereas a product made from a gypsum composition containing as high as 1 wt. % polyvinyl alcohol (and no wax-asphalt emulsion) was found to absorb 61% water, and further, a product made from a gypsum composition containing 10 wt. % wax-asphalt emulsion (and no polyvinyl alcohol) was found to absorb 12.3 wt. % water. Additional illustrations of the unexpected water-resistant properties afforded by the composition of the present invention appear in examples below.

The amounts of polyvinyl alcohol and wax-asphalt emulsion comprising the composition of the present invention can be as little as about 0.05 wt. % and about 2 wt. % respectively. Unless otherwise stated, the term "wt. %" when used herein and in the claims means weight percent based on the total weight of the ingredients of the composition from which the set gypsum product is made, said ingredients including the water of the wax-asphalt emulsion, but not including additional amounts of water that are added to the gypsum composition for forming an aqueous slurry thereof.

A number of important advantages are afforded by the present invention. For example, lower amounts of polyvinyl alcohol and wax-asphalt emulsion can be used to impart a desired degree of water resistance to a gypsum product than if each of these additives is used individually. The relative cost of these additives and the degree of improvement in water resistance obtained by using both of them is such that the cost of imparting a desired degree of water resistance to the gypsum product can be reduced. Another advantage of the present invention is that since desired water-resistant properties can be obtained by using less wax-asphalt emulsion than was typically the case heretofore, there is less of a tendency for the wax-asphalt emulsion to retard the hydration of gypsum and thus, less of a need to incorporate in the gypsum composition additional amounts of set accelerator. In the overall picture, it has been found that the water-resistant properties of gypsum wallboard made on an industrial scale from the composition of the present invention are more uniform, and less erratic and unpredictable.

DETAILED DESCRIPTION OF THE INVENTION

The major ingredient of the composition of the present invention is calcined gypsum that is capable of hydrating with water to form set gypsum.

Polyvinyl alcohol, one of the water-resistant additives comprising the composition of the present invention, is a well known commercially available material. Speaking generally, polyvinyl alcohol is prepared by hydrolyzing polyvinyl acetate. The source of the polyvinyl alcohol is preferably a substantially completely hydrolyzed form of polyvinyl acetate, that is, about 97 to 100% hydrolyzed polyvinyl acetate. It has been observed that reduced degrees of water-resistant properties are obtained when using a less completely hydrolyzed polyvinyl acetate, for example, about 87% hydrolyzed polyvinyl acetate. The polyvinyl alcohol should be cold-water insoluble and soluble in water at elevated temperatures, for example, at temperatures of about 140° to about 205°F. In general, a 4 wt. % water solution of polyvinyl alcohol at 20°C will have a viscosity of about 25 to about 70 cp as determined by means of the Hoeppler falling ball method. Commercially available polyvinyl alcohols for use in the composition of the present invention are available from E. I. du Pont de Nemours and Company, sold under the trademark "Elvanol" and from Monsanto Co., sold under the trademark "Gelvatol". Examples of such products are Elvanol, Grades 71-30, 72-60, and 70-05, and Gelvatol, Grades 1-90, 3-91, 1-60 and 3-60.

The wax-asphalt emulsion for use in the composition of the present invention is also a well known material which is commercially available. Such emulsions are described in U.S. Pat. No. 2,464,759 to Camp and other of the patents referred to hereinabove. In general, the wax used in the emulsion is a paraffin or microcrystalline wax, but other waxes can be used also. The asphalt in general will have a softening point of about 115°F to about 185°F, as determined by the ring and ball method. Various methods for preparing the wax-asphalt emulsion have been reported. For example, the wax-asphalt emulsion can be prepared by blending molten wax and molten asphalt in an aqueous medium which contains suitable emulsifying or dispersing agents. Or an aqueous emulsion of wax can be combined with an aqueous emulsion of asphalt. Although it is preferred to add an emulsion containing both the wax and asphalt to the composition of the present invention, it is also possible to add thereto a wax emulsion and an asphalt emulsion to the composition as described in the aforementioned Camp patent. The total amount of wax and asphalt in the aqueous emulsion will generally comprise about 50 to about 60 wt. % of the aqueous emulsion.

The weight ratio of asphalt to wax can vary from about 1 to 1 to about 10 to 1. Particularly good results have been obtained with a wax-asphalt emulsion that contains about 3 parts of asphalt to about 1 part of wax. Commercially available wax asphalt emulsions that can be used in the composition of the present invention are sold by United States Gypsum Co. (Wax Emulsion), The Flintkote Co. (No. 52 Emulsion), and Douglas Oil Co. (Docal No. 1034).

As mentioned above, the amount of polyvinyl alcohol and wax-asphalt emulsion used in the composition of the present invention should be at least about 0.05 wt. % and about 2 wt. % respectively. If lower amounts are used, little improvement in water-resistant properties are realized. The preferred amounts of polyvinyl alcohol and wax-asphalt emulsion are about 0.15 to about 0.4 wt. % and about 3.0 to about 5.0 wt. % respectively. Higher amounts of each of the additives can be used. However, the small degree of improvements in water resistance attained by using amounts of polyvinyl alcohol and wax-asphalt emulsion in excess of about 1 wt. % and 8 wt. % respectively does not appear to justify using amounts in excess of these figures.

The amount of gypsum used in the composition can vary over a wide range and generally will comprise about 87 to about 98 wt. % of the composition, depending on the particular gypsum product made from the composition. A recommended wallboard formulation comprises about 93 to about 96 wt. % gypsum.

In addition to the gypsum and water-resistant additives described above, the composition can also contain other conventional additives such as set accelerators, foaming agents, dispersants and core adhesives which increase the strength of the bond between the paper liners and the gypsum core. Such materials can be used in conventional amounts.

The composition from which the set gypsum product is made will generally comprise an aqueous slurry of gypsum and the water-resistant additives described above. The wax-asphalt emulsion can be added directly to the gypsum slurry. The polyvinyl alcohol, which as mentioned above is cold-water insoluble, should be added to the composition in the form of an aqueous solution. The solution can be prepared by heating a mixture of the polyvinyl alcohol and water to a temperature at which the polyvinyl alcohol dissolves. Temperatures of about 140°F to about 205°F are exemplary. The polyvinyl alcohol solution can be added to the aqueous gypsum slurry or combined with the wax-asphalt emulsion to form a mixture which is added to the aqueous gypsum slurry. An aqueous mixture of the wax-asphalt emulsion and polyvinyl alcohol solution for addition to the aqueous gypsum slurry will generally comprise about 3 to about 12 parts by weight of polyvinyl alcohol and about 88 to about 97 parts by weight of wax-asphalt emulsion, and preferably comprises about 5 to about 7 parts by weight of polyvinyl alcohol and about 93 to about 95 parts by weight of wax-asphalt emulsion.

The term "wallboard" when used herein is intended to include panel-type gypsum products, including sheathing and tile-backing board.

In addition to preparing wallboard from the composition of the present invention, other gypsum products such as road patching compound and floor topping mixture can be made also. Water-resistant gypsum products comprising the composition of the present invention can be made according to conventional and available techniques.

EXAMPLES

Examples below are illustrative of compositions within the scope of the present invention. Comparative examples are set forth also.

Tests were conducted to compare the water resistance of set gypsum cubes formed from aqueous slurries of calcined gypsum ($CaSO_4 \cdot \frac{1}{2}H_2O$) and containing either polyvinyl alcohol or wax-asphalt emulsion or a mixture of said alcohol and said emulsion. Unless otherwise stated, the set gypsum cubes, which were 2 inches × 2 inches × 2 inches, were prepared as follows:

1. Polyvinyl alcohol and/or wax-asphalt emulsion and calcined gypsum were mixed with an amount of water such that the dry densities of the set cubes were within the range of about 48 to about 49.5 pounds per cubic foot. (This density range corresponds to that of commercially available one-half inch sheathing weighing 1,950 to 2,000 pounds per thousand square feet.) The compositions from which the set cubes were made contained also set accelerators, namely about 0.4 wt. % potassium sulfate and about 0.3 to about 0.7 wt. % of dihydrate gypsum. (The amounts of dihydrate gypsum used in the composition were varied in order to provide a uniform setting time of about 8½ minutes.) The amounts of polyvinyl alcohol and wax-asphalt emulsion used in preparing the various test samples are set forth in Table 1 below.
2. Compositions as described above were formed into cubes by pouring the slurry into a rigid brass mold.
3. The setting time was approximately 8½ minutes, and thereafter the cubes were removed from the mold and were oven-dried to a constant weight at 110°F.
4. The dry weights of the cubes were determined after a cooling period of about 1½ hours.
5. The set cubes were then immersed in water at 70°F for 2 hours. After withdrawing the cubes from the water, the percent water absorption thereof was calculated according to the formula:
   (wet wt. after immersion in water) - (dry wt.)/dry weight × 100 = % water absorption The wax-asphalt emulsion used in preparing the set gypsum cubes was approximately 57 wt. % solids of which 14 wt. % was paraffin wax and 43 wt. % was asphalt. The polyvinyl alcohol used in preparing the set gypsum cubes was Elvanol Grade 71-30, powdered polyvinyl alcohol having a bulk density of 25-27 pounds/cubic foot and a specific gravity of 1.3. The polyvinyl alcohol was added to the composition in the form of a solution that was prepared by adding 1.65 to 5 wt. % of polyvinyl alcohol to water at about room temperature, and then heating the resultant water slurry with agitation, to a temperature of about 194°F. In those examples which illustrate compositions containing both polyvinyl alcohol and wax-asphalt emulsion, a solution of the polyvinyl alcohol and said emulsion were first combined, and the resulting mixture was added to the gypsum slurry.

There is set forth in Table 1 below the results obtained following the procedure described above. It is noted that Example 1 in Table 1 shows the % water absorption of a control composition which contains neither polyvinyl alcohol nor wax-asphalt emulsion.

Table 1

| Example No. | Additive in Gypsum Cube wt. % pval* | wt. % WAE** | % Water Absorption of Gypsum Cube |
|---|---|---|---|
| 1 | None | None | 63.2 |
| 2 | 0.3 | None | 63.2 |
| 3 | 1.0 | None | 61.0 |
| 4 | None | 2.5 | 56.0 |
| 5 | None | 6.0 | 20.0 |
| 6 | None | 10.0 | 12.3 |
| 7 | 0.05 | 5.0 | 44.9 |
| 8 | 0.10 | 3.0 | 46.0 |
| 9 | 0.20 | 5.0 | 3.8 |
| 10 | 0.30 | 7.0 | 1.4 |
| 11 | 0.40 | 7.0 | 1.2 |

*polyvinyl alcohol
**wax-asphalt emulsion

The examples of Table 1 strikingly show how the use of the combination of polyvinyl alcohol and wax-asphalt emulsion in a set gypsum composition can greatly improve the water resistance thereof. A comparison of Example 1 with Examples 2 and 3 shows that the use of polyvinyl alcohol alone, even in an amount as high as 1%, has no or very little effect on the water resistance of the set gypsum product. A comparison of Example 1 with Examples 4, 5 and 6 shows that the use of increasing amounts of the wax-ashpalt emulsion alone improves the water resistance of the gypsum cube, with the % water absorption being 12.3% when using 10% of the emulsion. However, a comparison of Examples 6 and 11 shows that the use of as little as 0.4% polyvinyl alcohol in combination with 7% wax-asphalt emulsion in the composition of Example 11 (30% less emulsion than used in Example 6) results in a decrease in water absorption of 90%.

In summary it can be said that the present invention affords improved means for imparting water resistance to gypsum products wherein a high degree of water resistance can consistently be attained at relatively low cost while avoiding certain disadvantages encountered in the use of heretofore known water-resistant additives.

We claim:

1. A composition, capable of being set by water into a water-resistant gypsum product, comprising gypsum, at least about 0.15 wt. % of polyvinyl alcohol and at least about 3 wt. % of wax-asphalt emulsion, wherein the total amount of said polyvinyl alcohol and said wax-asphalt emulsion present in the composition is such that the water-resistant properties of said gypsum product are greater than a gypsum product prepared from a like gypsum composition which contains one of said polyvinyl alcohol or said wax-asphalt emulsion in an amount the same as the figure of said total amount.

2. A composition according to claim 1 wherein the amount of polyvinyl alcohol is no greater than about 1 wt. % and the amount of wax-asphalt emulsion is no greater than about 8 wt. %.

3. A composition according to claim 2 comprising about 0.15 to about 0.4 wt. % polyvinyl alcohol and about 3 to about 5 wt. % of wax-asphalt emulsion.

4. A composition according to claim 2 wherein the amount of gypsum in the composition is at least about 87 wt. % and no greater than about 96 wt. %.

5. A composition according to claim 3 wherein the amount of gypsum in the composition is about 93 to about 96 wt. %.

6. A process for preparing a set, water-resistant gypsum product comprising providing a mixture of water, gypsum, at least about 0.15 wt. % polyvinyl alcohol and at least about 3 wt. % wax-asphalt emulsion, and forming and setting said mixture into said gypsum product, wherein the total amount of said polyvinyl alcohol and said wax-asphalt emulsion present in the mixture is such that the water-resistant properties of said gypsum product are greater than a gypsum product prepared from a like gypsum mixture which contains one of said polyvinyl alcohol or said wax-asphalt emulsion in an amount the same as the figure of said total amount.

7. The process of claim 6 wherein said polyvinyl alcohol is present in an amount no greater than about 1 wt. % and said wax-asphalt emulsion is present in an amount no greater than about 8 wt. %.

8. The process of claim 7 wherein said polyvinyl alcohol is present in an amount of from about 0.15 to about 0.4 wt. % and said wax-asphalt emulsion is present in an amount of from about 3 to about 5 wt. %.

9. The process of claim 7 wherein said gypsum is present in an amount of at least about 87 wt. % and no greater than about 96 wt. %.

10. The process of claim 8 wherein said gypsum is present in an amount of about 93 to about 96 wt. %.

11. The process of claim 6 wherein said mixture is formed and set into water-resistant gypsum wallboard.

12. A water-resistant gypsum product having a core comprising the set composition of claim 1.

13. A water-resistant gypsum wallboard having a core comprising the set composition of claim 3.

14. A water-resistant gypsum wallboard having a core comprising the set composition of claim 4.

15. A water-resistant gypsum wallbroad having a core comprising the set composition of claim 5.

16. A composition according to claim 1 wherein said polyvinyl alcohol is about 97 to 100% hydrolyzed polyvinyl acetate.

17. A composition according to claim 3 wherein said polyvinyl alcohol is about 97 to 100% hydrolyzed polyvinyl acetate.

18. A composition according to claim 4 wherein said polyvinyl alcohol is about 97 to 100% hydrolyzed polyvinyl acetate.

19. A composition according to claim 1 wherein the weight ratio of asphalt to wax in said emulsion is about 3 parts of asphalt to about 1 part of wax.

20. A composition according to claim 3 wherein the weight ratio of asphalt to wax in said emulsion is about 3 parts of asphalt to about 1 part of wax.

21. A composition according to claim 4 wherein the weight ratio of asphalt to wax in said emulsion is about 3 parts of asphalt to about 1 part of wax.

22. A composition, capable of being set by water into a water-resistant gypsum product, comprising at least about 87 wt. % and no greater than about 96 wt. % gypsum, about 0.15 to about 0.4 wt. % of polyvinyl which is about 97 to 100% hydrolyzed polyvinyl acetate and about 3 to about 5 wt. % of wax-asphalt emulsion, wherein the total amount of said polyvinyl alcohol and said wax-asphalt emulsion present in the composition is such that the water-resistant properties of said gypsum product are greater than a gypsum product prepared from a like gypsum composition which contains one of said polyvinyl alcohol or said wax-asphalt emulsion in an amount the same as the figure of said total amount.

23. A composition according to claim 22 wherein the weight ratio of asphalt to wax in said emulsion is about 3 parts of asphalt to about 1 part of wax.

24. A composition according to claim 23 comprising about 93 to about 96 wt. % gypsum.

25. A water resistant gypsum product having a core comprising the set composition of claim 22.

26. A water-resistant gypsum product having a core comprising the set composition of claim 23.

27. A water-resistant gypsum product having a core comprising the set composition of claim 24.

* * * * *

UNITED STATES PATENT OFFICE
CERTIFICATE OF CORRECTION

PATENT NO. : 3,935,021
DATED : January 27, 1976
INVENTOR(S) : Dale R. Greve and Eugene D. O'Neill It is certified that error appears in the above-identified patent and that said Letters Patent are hereby corrected as shown below:

IN THE SPECIFICATION

Column 1, Line 26, delete "applications wallboard wallboard".

Column 1, Line 60, "(U.S. Pat. No. 1,975,787)," should read --(U.S. Pat. No. 1,975,787);--.

Column 3, Line 7, read --of-- after "time".

IN THE CLAIMS

Column 8, last line, read --alcohol-- after "polyvinyl".

Signed and Sealed this fifteenth Day of June 1976

[SEAL]

Attest:

RUTH C. MASON
Attesting Officer

C. MARSHALL DANN
Commissioner of Patents and Trademarks